(12) United States Patent
Dickgiesser et al.

(10) Patent No.: US 12,028,229 B2
(45) Date of Patent: Jul. 2, 2024

(54) PROACTIVE MICROSERVICE ANOMALY AND OUTAGE MANAGEMENT BASED ON SUPERVISED MACHINE LEARNING

(71) Applicant: SAP SE, Walldorf (DE)

(72) Inventors: Klaus Dickgiesser, Karlsruhe (DE);
Ebru Polat, Cagnes sur Mer (FR);
Andreas Loebel, Walldorf (DE);
Thomas Stein, Walldorf (DE);
Sundaresan Krishnamurthy, Bangalore (IN); Wieland Schreiner, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/955,925

(22) Filed: Sep. 29, 2022

(65) Prior Publication Data

US 2023/0198877 A1 Jun. 22, 2023

(30) Foreign Application Priority Data

Dec. 17, 2021 (EP) ..................................... 21215452

(51) Int. Cl.
*H04L 43/0817* (2022.01)
*G06F 8/41* (2018.01)
(Continued)

(52) U.S. Cl.
CPC .......... *H04L 43/0817* (2013.01); *G06F 8/433* (2013.01); *H04L 41/0654* (2013.01); *H04L 67/51* (2022.05)

(58) Field of Classification Search
CPC . H04L 43/0817; H04L 41/0654; H04L 67/51; G06F 8/433; G06F 11/0709;
(Continued)

(56) References Cited

U.S. PATENT DOCUMENTS

| | | | |
|---|---|---|---|
| 2018/0131558 A1* | 5/2018 | Sharma | G06Q 10/0637 |
| 2019/0179663 A1* | 6/2019 | Xu | G06F 9/4806 |

(Continued)

OTHER PUBLICATIONS

"European Application Serial No. 201215452.0, Extended European Search Report mailed Jun. 23, 2022", 10 pgs.
(Continued)

*Primary Examiner* — Schquita D Goodwin
*Assistant Examiner* — Mehulkumar J Shah
(74) *Attorney, Agent, or Firm* — SCHWEGMAN LUNDBERG & WOESSNER, P.A.

(57) ABSTRACT

Various aspects relate to a distributed software application. A distributed software application is a software application that is distributed among multiple microservices. The different microservices are different processes that communicate with each other not as a monolithic software application by directly invoking each other's APIs within a single executable process, but using a different communication mechanism, e.g., by using a message passing functionality such as a message bus, a message queue, or a service mesh. In addition to internally communicating with each other and consuming each other's functionality, the microservices may also consume functionality provided by reuse services external to the software application. Such reuse services may be used by multiple software applications and can include, e.g., a logging service, a database service, and/or a storage service, and the like.

20 Claims, 8 Drawing Sheets

(51) Int. Cl.
*H04L 41/0654* (2022.01)
*H04L 67/51* (2022.01)

(58) Field of Classification Search
CPC ............ G06F 11/0751; G06F 11/3409; G06F 2201/865; G06F 11/3006; G06F 11/302; G06F 11/3051; G06F 11/3055; G06F 11/30; G06F 11/34; G06F 11/07; G06F 8/41
See application file for complete search history.

(56) References Cited

U.S. PATENT DOCUMENTS

| | | | |
|---|---|---|---|
| 2019/0340059 A1* | 11/2019 | Bagarolo | G06F 8/71 |
| 2020/0050612 A1* | 2/2020 | Bhattacharjee | G06F 16/24526 |
| 2020/0401465 A1* | 12/2020 | Douglas | G16H 40/00 |
| 2020/0409716 A1* | 12/2020 | Balasubramanian | G06F 11/302 |
| 2021/0099543 A1* | 4/2021 | Cooney | H04L 67/10 |
| 2021/0135973 A1* | 5/2021 | Vedam | G06F 9/54 |

OTHER PUBLICATIONS

Bansal, Chetan, "DeCaf: Diagnosing and Triaging Performance Issues in Large-Scale Cloud Services", arXiv:1910.05339v5, (Feb. 2, 2020), 10 pgs.

Kingma, D., "Adam: A method for stochastic optimization", International Conference on Learning Representations., [Online]. Retrieved from the Internet: URL:https: arxiv.org pdf 1412.6980.pdf, (2015), 1-15.

* cited by examiner

PROACTIVE MICROSERVICE ANOMALY AND OUTAGE MANAGEMENT BASED ON SUPERVISED MACHINE LEARNING

CLAIM OF PRIORITY

The present patent application claims the priority benefit of the filing date of European Application (EPO) No. 21215452.0 filed Dec. 17, 2021, the entire content of which is incorporated herein by reference.

TECHNICAL FIELD

This document generally relates to machine learning. More specifically, this document relates to proactive microservice anomaly and outage management based on supervised machine learning.

BACKGROUND

Complex software applications are nowadays often implemented in a distributed way as a set of microservices. The respective microservices perform respective tasks of the application, and can be deployed in many different ways, e.g., on different physical devices, on different cores of the same device, or even all on the same core of a single device. Some of the microservices may provide "capabilities", that is, user-facing functionality of the application, whereas other microservices may provide internal functionality that is used by other microservices. Moreover, the microservices may consume reuse services provided by external software.

BRIEF DESCRIPTION OF DRAWINGS

The present disclosure is illustrated by way of example and not limitation in the figures of the accompanying drawings, in which like references indicate similar elements.

DETAILED DESCRIPTION

Overview

Figure 2:
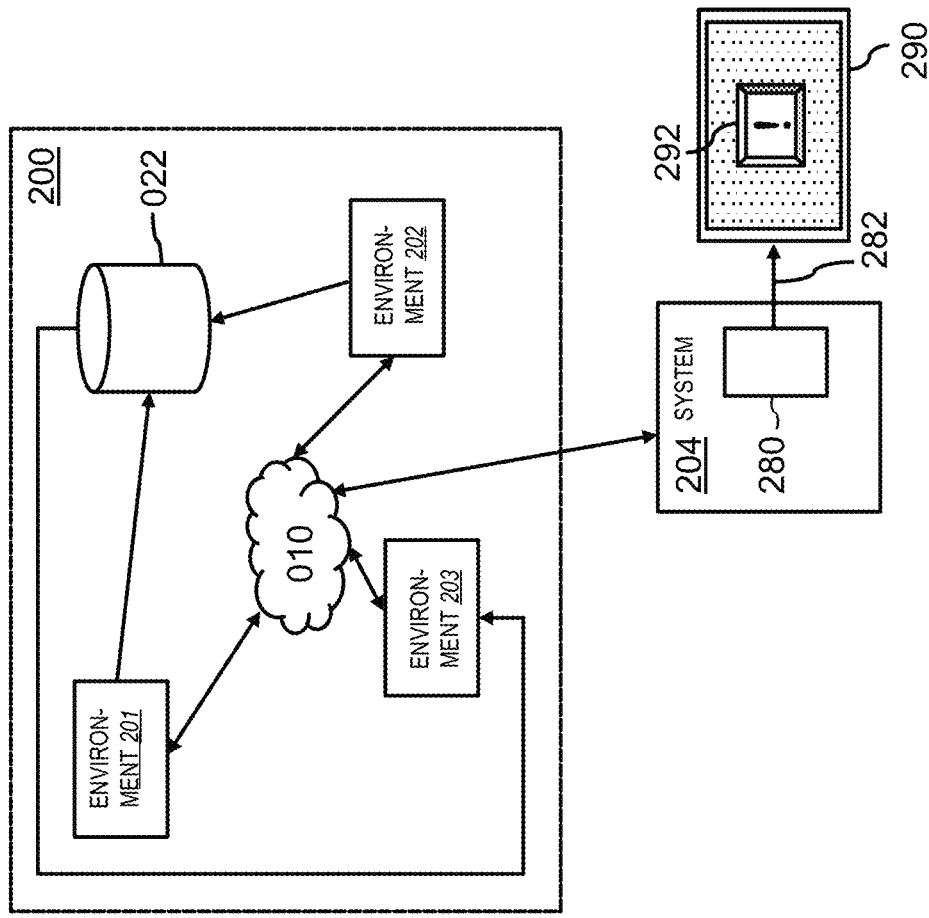
FIG. 2 shows a cloud system for running a distributed software application.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Various aspects relate to a distributed software application. A distributed software application is a software application that is distributed among multiple microservices. The different microservice are different processes that communicate with each other not as a monolithic software application by directly invoking each other's APIs within a single executable process, but using a different communication mechanism, e.g., by using a message passing functionality such as a message bus, a message queue, or a service mesh. In addition to internally communicating with each other and consuming each other's functionality, the microservices may also consume functionality provided by reuse services external to the software application. Such reuse services may be used by multiple software applications and can include, e.g., a logging service, a database service, and/or a storage service, and the like.

The distributed software application can be deployed in various ways, e.g., different microservices can each run on a different device, or some or all microservices can run on a single device; respective devices can all be operated within the same data centre, or the devices may be distributed among multiple data centres, possibly in different countries. A single microservice can run on multiple devices, e.g., in a replicated way to improve its resilience or throughput. How the application is deployed exactly depends on several factors, in particular its load. For example, a distributed software application may initially be deployed on a single physical device but may, as its load increases, be deployed on more and more different devices.

The distributed software application may provide multiple capabilities. A capability is a user-facing functionality of the distributed software application. Here, the term "user" refers to any party consuming the functionality, for example a human user or another software application. For example, a capability may correspond to a particular API end-point, a logical part of a user interface, etcetera. Capabilities may also be differentiated in a technical sense in that respective capabilities have respective sets of microservices that they, directly or indirectly, depend on, and/or they rely on these microservices according to a different dependency type. Typically, there is a subset of one or more microservices of the distributed software application that is responsible for providing the user-facing functionality, e.g., in the form of a web service and/or or a web application. For example, the user-facing functionality may be provided by a single microservice. One or more other microservices may provide functionality that is used directly or indirectly by these user-facing microservices but may not provide user-facing functionality themselves.

As a concrete example, the distributed software application may be a cloud-based application lifecycle management solution, such as SAP Cloud ALM. Generally, such an application may provide capabilities allowing control of implementation, operations, and/or execution of service of a business landscape of a customer. In particular, the application may provide capabilities allowing control of the building, running, and/or execution of software applications, e.g., distributed software applications. For example, the customer business landscape may comprise a sell-from-stock process, an order-to-cash process, and/or a quote-to-cash process. The implementation capabilities may comprise a project management capability, e.g., for guiding the customer through implementation. The operations capabilities may include a monitoring capability, e.g., for monitoring business processes in the customer landscape, for integration monitoring, and/or for user monitoring.

The capabilities provided by the cloud-based application lifecycle management application may include capabilities allowing control of one or more of the following aspects of application lifecycle management: project management (e.g., creating an implementation project), process management scoping (e.g., defining processes of the project, e.g., sell-from-stock, order-to-cash, etc.), task management (e.g., generating tasks depending on scoped processes), change management (e.g., implementing and configuring depending on the tasks), test management, and deployment management. For example, the application may include a project management capability. This capability may depend on a user management service, a task management service, a workflow service, and/or a logging service. These services may be provided by microservices of the application or itself or by external reuse services, for example, the workflow service and/or the logging service may be external reuse services.

Various aspects relate to the monitoring of a distributed software application. As is known per se, such monitoring may comprise periodically monitoring availability of the microservices of the application, e.g., using a heartbeat, a health check, or the like. The monitoring can be at least every second, at least every ten seconds, or at least every minute, for example. The monitoring may detect a service degradation of a microservice. A degradation may be a deviation of an operational parameter of the microservice that indicates reduced performance, for example, an outage (in other words, a downtime or a service disruption), an increased latency or response time, an increased packet loss, an increased percentage of unanswered queries, an increase in memory consumption, an increase in CPU utilization, etc. For example, increased memory consumption may impact other uses in a multi-tenancy environment in which a microservice may run, and similarly for increased CPU utilization.

Interestingly, when a service degradation is detected, the service degradation may be mapped to the capabilities that it affects. To this end, a dependency map may be used. The dependency map may represent dependencies of the distributed software application. Several types of dependencies may be represented. For example, the set of dependencies represented by the dependency map may include one or more dependencies of microservices of the application on other microservices of the application, and/or on one or more dependencies of microservices on external reuse services. Interestingly, the dependency map may also include dependencies of capabilities, e.g., one or more dependencies of capabilities on microservices of the application, and/or one or more dependencies of capabilities on external reuse service. Generally, a dependency of a capability or microservice A on a microservice or re-use service B may indicate that, if B is directly or indirectly affected by a service degradation, then A may be affected as well. Different types of dependencies exist and these different types may propagate in a different way across the dependency map, as also discussed in more detail elsewhere in this specification.

By using this dependency map, interestingly, it may be determined at the level of individual capabilities whether they are affected by the service degradation. For example, a capability may have a dependency on a microservice that provides its primary functionality (e.g., a hard dependency) but also on one or more microservices that provide additional functionality (e.g., soft dependencies for providing non-essential functionality or hard dependencies for providing essential functionality). On the other hand, one microservice can be the provider of primary and/or additional functionality for multiple respective capabilities. Especially in complex distributed software applications, there can be many interdependencies between components, and these interdependencies can moreover change throughout the lifetime of the application as microservices are upgraded or replaced by alternative implementations. This makes it hard to oversee how a service degradation of an individual microservice affects the application.

The dependency map can be used to address this problem, and in particular, because the dependency map contains capability-level information, it allows the determination that, for example, a capability is affected by a service degradation of a microservice that does not directly correspond to its primary functionality and/or that one capability that depends on a microservice is affected, but another capability that depends on the same microservice is not affected (e.g., a microservice may provide at least two capabilities and it may be determined that one of these capabilities is affected whereas the other one is not). This allows the determination as to which parts of the distributed software application are affected, at a high level of granularity. An alert can then be raised that the capability is affected.

Because the alert is for a specific capability, more appropriate action can be taken, e.g., the impact of the degradation can be assessed more accurately. For example, an impact score of the service degradation may be computed automatically, which can be made more informative due to using the number and/or importance of affected capabilities. An alert may be raised specifically to users of the affected capability, preventing that unaffected users have to be alerted and allowing notification of users automatically and proactively, and to give more specific information about the impact of the service degradation. For example, the capability may be configured such that it shows the alert when it is started, or users currently using the capability may be notified, e.g., using a built-in support facility of the capability or outside of the capability, e.g., in a central notification centre facility. Users are typically not aware of the specific dependencies of the capabilities that they are consuming, so being able to provide information in terms of capabilities, and/or only informing users that use a certain capability, provides alerts that are much more informative to the users and allow the users to better assess and deal with the service degradation.

Optionally, the distributed software application may use a service mesh for communication between the microservices and possibly also between the microservices and the external reuse services that are used. For example, the distributed software application may be a cloud-based (in particular, cloud-native) application, meaning that it uses a multi-tenancy environment with shared compute and/or storage facilities, e.g., accessed via the internet and/or provided by a cloud provider that is different from the party that operates the software application. In applications that use asynchronous communication mechanisms such as a service mesh, and/or that are operated on the cloud, managing the individual microservices in relation to the provided capabilities is particularly relevant, because the different microservices can separately experience service degradations and such service degradations can affect capabilities in complex and unexpected ways.

Optionally, a set of users affected by the detected service degradation may be determined based on historic usage data of the capabilities. The set of users may be determined according to their usage of the affected capabilities, for example during the last N days for a predetermined value N. The alert may then be raised specifically to these affected users. Unaffected users may not be notified. For example, the alert may be raised by pushing the capability outage or other degradation into particular customer tenants of affected users, or by using a built-in support mechanism or a central notification service. This has the benefit that unaffected users are not needlessly notified. Using actual usage data ensures that users are contacted that are actually likely to be affected. E.g., users that have access to a capability, e.g., as part of a subscription plan, but do not actually use it, may not be notified, and similarly for users that do not have access to the capability. Other ways of determining which users to notify are also possible, e.g., the set of users may be determined based on role assignments and/or authorizations for the affected capabilities.

Optionally, a resolution notification of the service degradation may be obtained and reported to the affected users. For example, the resolution notification may be automatically determined by automatically determining that the service degradation has been remedied, or the resolution notification may be manually entered. For example, notifications may be reported indicating when the capability is expected to be back to normal operation, and/or indicating that the capability is back to normal operation. This way, the users of the capability get better feedback not only about the detected problem with the capability, but also about its resolution.

Typically, the mapping of the detected service degradation of the microservice to the affected capability may be recursive, e.g., it may be determined that a capability is affected also in cases where the capability does not directly depend on the microservice according to the dependency map, but indirectly via one or more other microservices. Thus, the mapping may include recursively propagating the service degradation across the dependencies indicated by the dependency map.

Optionally, the dependency map may indicate dependency types of dependencies. For example, dependencies can be indicated as hard or soft. For example, a project management capability may have a hard dependency on a project management micro service, and a soft dependency on a task management microservice and/or a job scheduler microservice. A test management capability may have a hard dependency to a test management microservice and a hard dependency to a job scheduler. For example, the job scheduler may be a hard dependency for the test management capability since, without a job scheduler, no test result data may be collected, and with no new test result data, the test success cannot be evaluated and deployment cannot be performed. The dependency of the project management capability to the job scheduler may be a soft dependency, e.g., because in project management the job scheduler may be used to clean up and synchronize data. If this clean-up is not available immediately, the user may still continue to work with project management capability.

Dependencies may be propagated across the dependency map according to their dependency types. Also, different ways in which the capability is affected may be determined. For example, if all dependencies in the chain of dependencies between the capability and the microservice are hard dependencies, it may be determined that the capability is critically affected, whereas if there is at least one soft dependency, the capability may be determined to be non-critically affected. The alert and/or the parties alerted may also depend on the way in which the capability is affected. The use of dependency types provides an even higher degree of granularity in the way in which service degradations are mapped to capabilities and subsequently reported.

Optionally, the dependency map may be derived automatically from microservice metadata of the multiple microservices. Dependencies of microservices on other microservices and/or reuse services can be determined automatically, e.g., based on a dependency declaration manifest. Interestingly, dependencies of capabilities on microservices and/or reuse services can also be determined automatically, e.g., based on a manifest of the microservice that provides the capability. By tracking dependencies automatically, capability-based monitoring becomes easier to set up and to adapt to changing dependencies, e.g., the monitoring can combine well with automatic deployment of updated microservices. The derivation of the dependency map can itself be implemented as a separate microservice of the monitoring application or the distributed software application.

Optionally, the service degradation of the microservice may be reported automatically via an issue tracking system, for example to DevOps or Site Reliability Engineering (SRE). This may enable the service degradation to be fixed in a timely fashion, e.g., before the service goes completely down. The reporting of the service degradation may indicate the capability or capabilities affected by the service degradation. Including the capabilities enables taking more appropriate action, e.g., it becomes easier to assess the impact of the service degradation.

Optionally, a certain amount of waiting time may be introduced between the detection of the service degradation and the raising of the alert. The alert may be raised only if the service degradation persists. This way, the amount of unnecessary alerts can be reduced. The waiting time can depend, e.g., on the capability, the type of service degradation, and/or the dependency types between the capability and the degraded microservice.

Optionally, in addition to detecting service degradations as they occur, it is also possible to predict them before they happen. To this end, telemetry data of a microservice may be collected and used as input to a degradation prediction model that is trained to predict service degradations of the microservice; in other words, the degradation prediction model may recognize anomalies in the telemetry data that indicate a possible future service degradation. The model can be specific to the particular microservice or to a particular type of microservice, or it can be a general service degradation model.

Interestingly, the degradation prediction model may have been trained on historic telemetry data of service degradations that have affected capabilities. For example, historic data may be used of service degradations of which a root cause analysis has been performed and that have been annotated with the capability or capabilities that were affected. By using training data relating to affected capabilities, only anomalies that actually led to capabilities being affected are trained to be detected. This way, unnecessary alerts of predicted service degradations can be prevented, or looking at it from another way, it becomes feasible to set the threshold for prediction to be more sensitive since there are less false positives to be dealt with. Interestingly, a trained machine learning model is used as opposed to, for example, fixed, manually defined rules. As the inventors realized, whether or not certain telemetry data indicates a probable service degradation can be highly context-dependent, making it hard to capture this in fixed rules. For example, load can be time-dependent, e.g., a time reporting system may normally experience high load at the beginning or end of a business day. By using a trained model, it becomes possible to learn to separate such normal patterns from anomalies. Thus, use of the provided degradation prediction model allows service degradations to be dealt with more effectively.

Upon predicting a service degradation of a microservice, an alert for this prediction can be raised as described herein. In particular, the dependency map may be used to determine affected capabilities. The affected capabilities can also be determined based on the training data, e.g., based on which capabilities were reported to be affected according to the training data in instances with similar telemetry data to the current telemetry data for which a service degradation is predicted. Although this may in some cases be an alternative to using the dependency map, the use of the dependency map has the benefit that it can stay up to date as the application evolves over time. Instances with similar telemetry data can also be extracted from the training data and reported to a user, e.g., DevOps or SRE, to help take appropriate measures.

Optionally, the degradation prediction model may be configured to output a type of the predicted service degradation. For example, service degradations of the training data may be annotated with a degradation type, e.g., determined by root cause analysis, that the model may then be trained to output. Interestingly, by using a training dataset of service degradations that have affected capabilities and for which a root cause analysis was performed with an aim of getting the capabilities back up and running, degradation types can be determined that are informative of the effects on end-user capabilities and not just on the particular low-level problem of a microservice somewhere in the software application. For instance, in practice, the fact that the task management capability may be affected is important information in addition to or even instead of the information that some specific middleware microservice X has too high a load.

Outputting a type of predicted service degradation is useful by itself, but is especially useful when used to determine a resolution for the predicted service degradation based on the type. This determined resolution may optionally be automatically applied. In this sense of automatically applying resolutions, the monitoring of the distributed software application may be regarded as fully autonomous. Thus, the distributed software application is provided with auto-recovery capabilities, sometimes also referred to as self-healing.

Optionally, a validated resolution for the predicted service degradation may be obtained, for example, a validation that was decided upon or confirmed by a user, or one that was automatically detected to be successful. The degradation prediction model may be retrained based on the validated resolution. Thereby, the degradation prediction model can be progressively improved to learn from an increasing amount of training data or training data that is more up-to-date with respect to the components of the distributed software application and the way it is deployed.

In addition to monitoring the microservices of the distributed software application itself, also the reuse services can be monitored, for example, in the same way that the microservices of the application itself are monitored or by retrieving monitoring data from an external monitoring functionality. Detected or predicted service degradations of the reuse services can be dealt with in the same way as for microservices of the distributed software application itself.

Various embodiments relate to a cloud system that runs the distributed software application and that also performs the monitoring. Such a cloud system may comprise multiple respective execution environments configured to execute the multiple respective microservices, and an execution environment configured to execute a monitoring microservice that performs the monitoring.

It will be appreciated by those skilled in the art that two or more of the above-mentioned embodiments, implementations, and/or optional aspects of the inventive subject matter may be combined in any way deemed useful.

Modifications and variations of any system and/or any computer-readable medium, which correspond to the described modifications and variations of a corresponding computer-implemented method, can be carried out by a person skilled in the art on the basis of the present description.

DESCRIPTION

Figure 1:
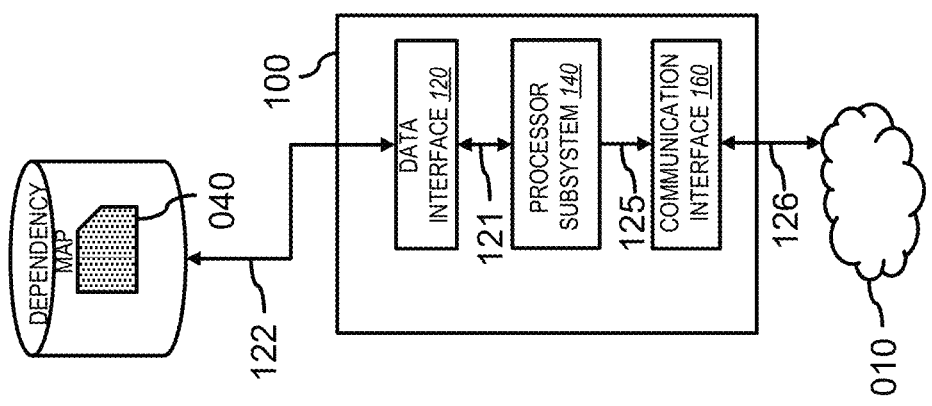
FIG. 1 shows a system for monitoring a distributed software application.

FIG. 1 shows a system 100 for monitoring a distributed software application. The distributed software application may provide multiple capabilities. The distributed software application may be distributed into multiple microservices.

The system 100 may comprise a data interface 120 for accessing a dependency map 040. The dependency map 040 may represent dependencies of the distributed software application. Dependency map 040 may indicate that a depending capability or microservice of the software application depends on one or more depended-on microservices of the software application and/or reuse services external to the software application. In addition to the dependency map 040, the data interface 120 may be for accessing a trained degradation prediction model as described herein.

For example, as also illustrated in FIG. 1, the data interface 120 may access the dependency map 040 from a data storage. For example, the data interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the dependency map 040 and/or other data such as a trained degradation prediction model may each be accessed from a different data storage, e.g., via a different subsystem of the data interface 120. Each subsystem may be of a type as is described above for the data interface 120.

The system 100 may further comprise a processor subsystem 140 which may be configured to, during operation of the system 100, periodically monitor availability of the multiple microservices. The processor subsystem 140 may be configured to, when the periodic monitoring detects a service degradation of a microservice, determine at least one capability of the multiple capabilities affected by the service degradation according to the dependency map, and raise an alert that the capability is affected.

The system 100 may also comprise a communication interface 160 configured for communication 126 with other systems, e.g., systems running microservices of the distributed software application being monitored. Communication interface 160 may internally communicate with processor subsystem 140 via data communication 125. Communication interface 160 may be arranged for direct communication with the other systems, e.g., using USB, IEEE 1394, or similar interfaces. Communication interface 160 may also communicate over a computer network, for example, a wireless personal area network, an internet 010, an intranet, a LAN, a WLAN, etc. For instance, communication interface 160 may comprise a connector, e.g., a wireless connector, an Ethernet connector, a Wi-Fi, 4G or 4G antenna, a ZigBee chip, etc., as appropriate for the computer network. Communication interface 160 may also be an internal communication interface, e.g., a bus, an API, a storage interface, etc.

System 100 may be configured to perform the monitoring of the distributed software application as a microservice. For instance, processor subsystem 140 may be configured to perform communication, within system 100 and/or with other systems, by using a communication mechanism such as a message bus, a message queue, or a service mesh. The communication mechanism may be operated by system 100. The environment, in terms of software and hardware in which a microservice operates, is generally referred to an execution environment. System 100 may be configured to provide multiple respective execution environments configured to execute multiple respective microservices, e.g., system 100 may execute one more microservices of the distributed software application instead of or in addition to performing the monitoring. The execution environments may be separated from each other by hardware and/or software shielding mechanisms, e.g., different execution environments may be executed on different CPUs and/or in different sandboxes and/or virtual machines. Such separation is desirable from a security point of view but not needed in principle. It is beneficial to operate the monitoring microservice separately from the microservice(s) that are being monitored, e.g., on a different CPU or more preferably on a different physical device. This way, performance degradations of the microservice(s) have reduced impact on the monitoring microservice and accordingly the monitoring can remain active to monitor, report, and/or resolve the degradation. Another benefit of using separate computational resources for the monitoring microservice is that, in this way, the monitoring microservice does not generate additional load on the environment of the microservices which are monitored.

In general, each system described in this specification, including but not limited to the system 100 of FIG. 1, may be embodied as, or in, a single device or apparatus, such as a workstation or a server. For example, system 100 may be implemented as or in a virtual machine provided by an infrastructure as a service provider such as Google Compute Engine, Amazon Elastic Compute Cloud, or the like. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers.

FIG. 2 shows a cloud system 200 configured to run a distributed software application. The distributed software application may provide multiple capabilities and may be distributed into multiple microservices. The cloud system 200 may be further configured to perform a monitoring of the distributed software application as described herein by executing a monitoring microservice.

To execute the microservices of the distributed software application and the monitoring microservice, cloud system 200 may comprise respective execution environments 201-203. As an illustration, the figure shows two execution environments 201, 202 configured to execute two respective microservices of the distributed software application. Further, the figure shows an execution environment 203 configured to execute the monitoring microservice. The monitoring microservice may be configured to periodically monitor availability of multiple microservices executed in execution environments 201, 202, and, when the periodic monitoring detects a service degradation of a microservice, determine at least one capability of the multiple capabilities affected by the service degradation according to a dependency map, and raise an alert that the capability is affected, e.g., as discussed with respect to FIG. 1 and elsewhere.

As also discussed with respect to FIG. 1, the set of execution environments 201-203 is typically provided by one or more systems that each comprise a data interface, a processor subsystem, and a communication interface, e.g., as discussed for system 100 of FIG. 1. Such a system may be configured to execute one or more of the execution environments, e.g., execution environments 201-203 may be executed on a single system 100, e.g., a single device; or execution environments 201-203 may each be executed on respective systems, e.g., respective devices. For example, the cloud system 200 may run on one cloud, e.g., provided by an infrastructure as a service (IaaS) provider, or on a combination of several clouds, e.g., one cloud provided by an IaaS provider and an on-premise cloud, etc.

The figure also shows a message passing facility 010 used by the execution environments to communicate. The message passing facility 010 is typically asynchronous. For example, the message passing facility 010 can be a service mesh, a message queue, or a message bus. Through the use of such a message passing facility 010, loose coupling between the microservices can be achieved. As a concrete example, Apache Kafka may be used. Using such a message passing facility 010, the distributed software application may apply a resilience pattern such as a circuit breaker pattern, a bulkhead pattern, and/or a stateless service pattern. Although this reduces interdependence between the service and propagation of failure, still, problems in one microservice may affect another.

Also shown is a storage 022 for storing telemetry data. The storage 022 may be a storage shared between execution environments 201-203, e.g., a data lake or any of the possible shared storages as discussed for storage for FIG. 1. The execution environments 201-202 of the distributed software application may be configured to periodically write respective telemetry data to the storage 022. The monitoring microservice may access the telemetry data to predict service degradations using a trained degradation prediction model, and/or to train such a degradation prediction model.

Also shown is a system 204 configured to display an alert 292 that a capability is affected. The alert 292 may be raised by the monitoring microservice. The system may obtain the alert, e.g., via the message passing facility 010, or via another communication facility, e.g., a REST API, a web application, etc. The system 204 may be based on system 100 of FIG. 1, e.g., may comprise a data interface, a processor subsystem, and a communication interface as discussed for FIG. 1. The system 204 may further comprise an output interface 280 to a rendering device, such as a display 290, a light source, a loudspeaker, a vibration motor, etc., which may be used to generate a sensory perceptible output signal 282, which may be generated based on the raised alert.

Figure 3:
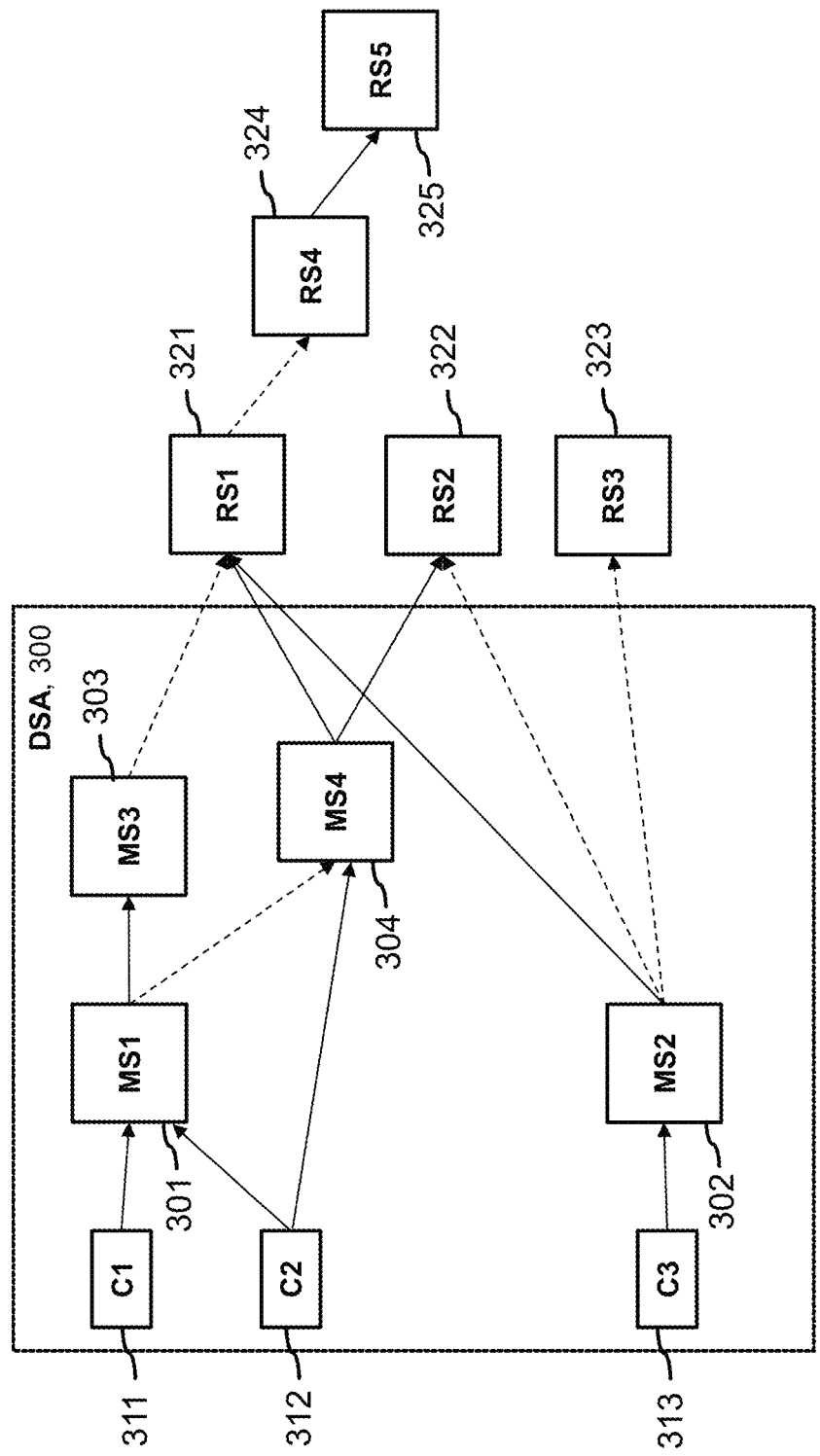
FIG. 3 shows a detailed example of a dependency map.

FIG. 3 shows a detailed, yet non-limiting, example of a dependency map of a distributed software application (DSA) 300.

The dependency map may indicate dependences between different types of components related to the DSA 300: capabilities, microservices, and/or reuse services. Generally, a capability can depend on one or more microservices and/or one or more reuse services. A microservice can depend on one or more other microservices and/or one or more reuse services. The dependency map may also indicate dependencies between reuse services.

The DSA 300 typically provides multiple capabilities, for example, at least 10, at least 20, or at least 40. By way of example, the figure shows three capabilities C1 311; C2 312; and C3 313.

The DSA 300 typically comprises multiple microservices, for example, at least 25, at least 50, or at least 100. By way of example, the figure shows four microservices of the DSA 300: MS1 301; MS2 302; MS3 303; and MS4 304.

The DSA 300 may optionally depend on one more reuse services external to the distributed software application DSA, for example at least 5 or at least 10. By way of example, five reuse services are shown: RS1 321; RS2 322; RS3 323; RS4 324; and RS5 325.

Arrows are used in the figure to denote example dependencies between these components. Capabilities C1 311, C2 312, and C3 313 depend respectively on microservices MS1 301; MS1 301 and MS4 304; and MS2 302. A capability may depend on a microservice that provides the capability to a user. For example, one or more microservices, e.g., MS1 301 may offer the respective capabilities by providing a user interface, e.g., web application, via which the capabilities are offered to a human end user. One or more microservices (that may overlap with the user-facing microservices mentioned above), e.g., MS2 302, may offer the respective capabilities by providing a callable interface to the capability, e.g., a REST API, to external applications as users of the capability.

A capability may also depend on a microservice not because the microservice directly provides the capability to a user, but because the microservice implements functionality needed to implement the capability. Interestingly, such dependencies may differ among multiple capabilities provided by a single microservice. For example, microservice MS1 301 in the figure directly provides the functionality for capabilities C1 311 and C2 312 (e.g., is the UI or API endpoint for these capabilities). In the example shown in the figure, capability C2 312 in addition has a hard dependency on microservice MS4 304, whereas capability C1 311 does not have a direct dependency on microservice MS4 304 (although it indirectly has a soft dependency on microservice MS4 304 via microservice MS1 301). For example, MS1 301 may be a test management microservice, offering a test preparation capability C1 311 and a test execution C2 312. Here, the test execution capability C2 312 may depend on a scheduling microservice MS4 304 while the test preparation capability C1 311 may not.

In case a capability, e.g., C2 312, that is implemented by a given microservice, e.g., MS1 301, has a dependency on a further microservice, e.g., MS4 304 (e.g., because, to implement the capability C2 312, the microservice MS1 301 uses an API call of MS4 304), such a dependency is typically not also included in the dependency graph as a dependency of the microservice MS1 301 (or only included as a soft dependency). This allows to distinguish between affected and unaffected capabilities of the microservice, e.g., capability C1 311 may be affected less or be unaffected by a service degradation of microservice MS4 304.

Also the microservices may have dependencies among each other. This is illustrated in the figure by microservice MS1 301 depending on microservices MS3 303, MS4 304. The microservices may also depend on external reuse services, for example, microservice MS3 303 in this figure depends on reuse service RS1 321; microservice MS4 304 depends on reuse services RS1 321 and RS2 322; and microservice MS2 302 depends on reuse services RS1 321, RS2 322 and RS3 323. While not shown in the figure, one microservice can depend both on other microservices and on reuse services. Also reuse services may depend on each other, e.g., reuse service RS1 321 in the figure depends on reuse service RS4 324, which in turn depends on reuse service RS5 325.

The direct dependencies shown in the figure induce indirect dependencies, e.g., capability C2 312 may indirectly depend on microservice MS3 303 via microservice MS1 301, and on reuse service RS1 321 via microservice MS4 304. It is possible to have a capability have an indirect dependency to a microservice or reuse service by being linked to the microservice or reuse service via more than two other components, e.g., via at least three or at least five. When determining capabilities affected by a service degradation of a microservice MS1 301-MS4 304 or a reuse service RS1 321-RS5 325, indirect dependencies are typically taken into account.

The dependency map may also indicate dependency types. For example, there can be a set of possible dependency types. For example, as illustrated in the figure, the dependencies may be divided into hard dependencies (illustrated by solid lines, e.g., from C1 311 to MS1 301) and soft dependencies (illustrated by dashed lines, e.g., from MS1 301 to MS4 304). The type of dependency may affect how service degradations are propagated through the dependency map, for example, in combination with the type of service degradation. Additional or different dependency types are also possible.

Figure 4:
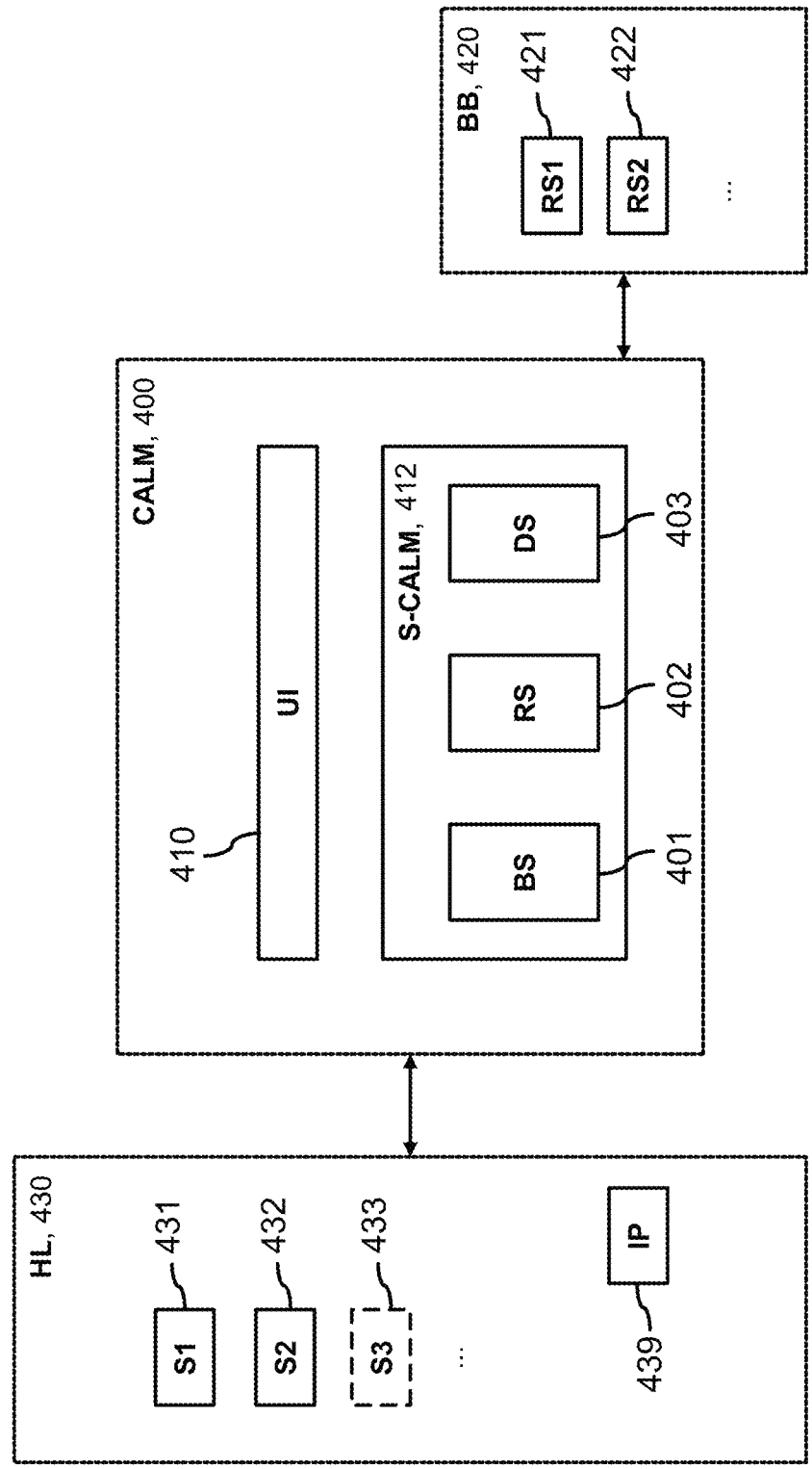
FIG. 4 shows a detailed example of a distributed software application.

FIG. 4 shows a detailed, yet non-limiting, example of a distributed software application for managing tenants and/or systems of a customer. In this example, the distributed software application is a cloud-based application lifecycle management application. As a concrete example, a version of SAP Cloud ALM CALM 400 is shown.

In this design the application comprises around 50 microservices. One microservice UI 410 may provide a user interface giving a harmonized end-user experience. Other microservices such as S-CALM 412 may provide various functionality. The functionality may include one or more microservices BS 401 providing build functionality. The functionality may include one or more microservices RS 402 providing run functionality. The functionality may include one or more microservices DS 403 providing execution or delivery functionality. The microservices BS 401, RS 402, and DS 403 may rely on a set of common microservices of the application CALM (not shown in this figure), e.g., providing analytics, machine learning, enterprise messaging, and/or security functionality. The microservices may further depend on external reuse services RS1 421, RS2 422, e.g., for accessing data and/or analytics functionality, provided by a backbone BB 420 shared across software applications.

The application lifecycle management application CALM may support application lifecycle management of a hybrid landscape HL 430, of the customer, which can support one or more services S1 431, S2 432, run on-premise at the customer, and/or one or more services S3 433 run by a service provider. This service provider can be the same service provider that also provides the application lifecycle management application CALM. An identity provider IP 439 to be consulted by the application lifecycle management application CALM may be part of the hybrid landscape HL and is in many cases operated on-premise.

An application lifecycle management application CALM is a good example of a distributed software application for which monitoring according to the provided techniques is useful. In one particular design of the application, it has 31 capabilities that depend on 49 internal microservices and also multiple external reuse services, organized according to hierarchical service mesh layers. Respective capabilities may have respective microservices as entry point. These microservices may have dependencies to other microservices. As an example, a project management service may have dependencies to a user management service, a task management service, but also to external reuse microservices such as a workflow service, logging service, etc. Such a reuse service, e.g., the logging service, may be reused by many other services and/or applications. Monitoring such a type of application in terms of capabilities greatly improves the informativeness of the monitoring.

Figure 5:
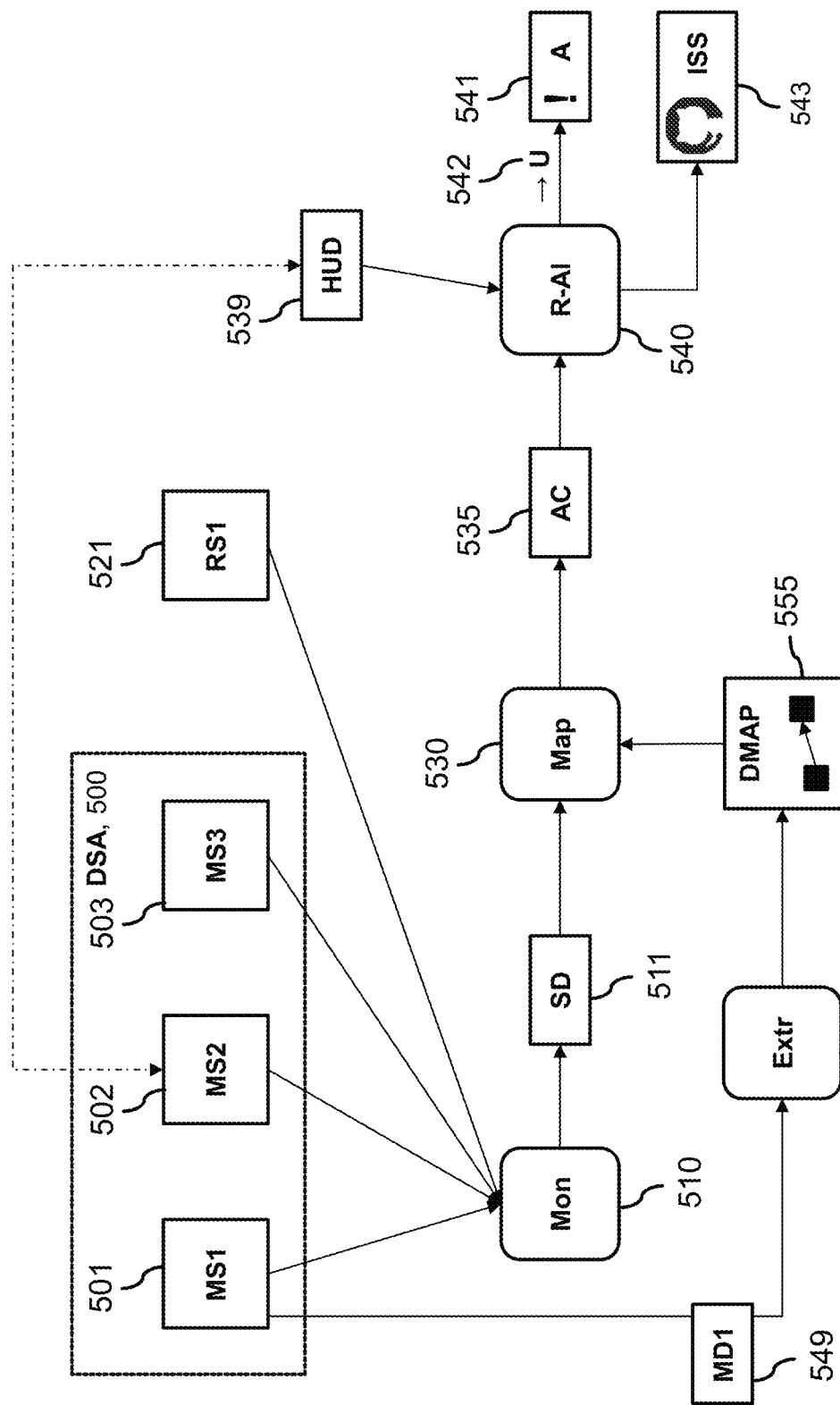
FIG. 5 shows a detailed example of how to monitor a software application.

FIG. 5 shows a detailed, yet non-limiting, example of how to monitor a software application.

Shown in the figure is a distributed software application (DSA) 500, e.g., distributed software application 300 of FIG. 3 or 400 of FIG. 4. The DSA 500 may provide multiple capabilities (not shown separately). The application DSA 500 may comprise multiple microservices. The figure shows microservices MS1 501; MS2 502; and MS3 503. As also discussed with respect to FIG. 3 and FIG. 4, the capabilities and/or microservices of the DSA can optionally depend on one or more reuse services. By way of example, the figure shows one reuse service RS1 521. Although the figure shows only one DSA 500, an implementation may monitor multiple distributed software applications at the same time using the provided techniques.

The figure shows a monitoring operation (Mon) 510 that monitors the availability of the multiple microservices MS1 501, MS2 502, MS3 503. For example, for each microservice, a health check may be performed regularly to check if the microservice is up and running as known per se. The monitoring may be performed periodically in the sense that it is performed at least once in a predefined time interval, e.g., at least once every second or minute, although it can also be triggered by a request or event. As shown in the figure, the monitoring Mon 510 may periodically monitor the availability of the reuse service(s) RS1 521 as well (if using), but this is not needed. For the monitoring, techniques that are known per se may be used. The monitoring Mon 510 may result in the detection of a service degradation (SD) 511, in a microservices MSi or reuse service RSi.

Upon detection of the service degradation (SD) 511, a mapper (Map) 530 may be used to determine at least one affected capability AC 535 of the multiple capabilities of the DSA 500 that is affected by the service degradation (SD) 511. The mapper (Map) 530 is also referred to as a dependency impact analyser. This capability AC 535 may be determined according to a dependency map (DMAP) 555. The DMAP 555 may represent dependencies of the DSA 500. According to the DMAP 555, a depending capability or microservice MSi of the DSA 500 may depend on one or more depended-on microservices MSj of the software application and/or reuse services RSi external to the DSA 500. For example, the dependency map may be as in FIG. 3.

Generally, when a reuse service RSi or depended-on microservice MSj is down, one or more capabilities of the application DSA may be down, but one or more other capabilities may still be consumed. This generally depends on whether or not there is a dependency between the capability and the service that is down, and/or on the type of dependency (hard, soft, message exchange, etc.). In case a service is down, the affected capability(ies) AC can be determined with the dependency map DMAP. In one example, a capability may be determined to be affected if there is a path in the dependency map, seen as a graph, from the capability to the service. In another example, a capability is determined to be affected if there is a path comprising only hard dependencies. In yet another example, the capability is determined to be severely affected if there is a path comprising only hard dependencies, and non-severely affected if there is a path comprising at least one soft dependency. Variations will be envisaged by the skilled person. An important aspect is that a service degradation at a microservice or reuse service can be mapped to a capability that is not directly provided by the microservice or reuse service itself but is still indirectly affected, as indicated by the dependency map DMAP.

As also illustrated, based on the determined capability (AC) 535, an alert may be raised R-Al 540, that the capability (AC) 535 is affected. This event may be handled by the monitoring application in any combination of the following:

One possibility is to inform customers about service degradation. This can avoid spurious customer incidents. Which customers to inform may be based on historic usage data HUD 539, representing usages of the multiple capabilities by a set of multiple users of the distributed software application. Upon determining an affected capability (AC) 535, a subset of users U 542 affected by the service degradation may be determined according to their usages of the affected capabilities according to the usage data HUD 539. Alert A 541 may be raised to these specific users U 542. With data driven intelligence and customer usage data HUD 539, the customers which are potentially affected may be automatically detected. Capability outages AC 535 may be pushed into the particular customer tenant. By analysing user profiles, personalized push notifications A 541 may be created to the relevant customer users U 542. For example, by applying Built-In Support, customer users U 542 may be informed proactively about capability outages and to avoid customer incidents. As an example, within a UI shell, on starting an application that has a service degradation, that information may be shown to the user. Customer users in customer tenants may also be enabled to subscribe to capability outage notifications. Customers may also be notified when the service is back to normal operation or the capability is otherwise no longer affected. For users it is particularly important to be informed in terms of capabilities instead of microservices.

The determined capability (AC) 535 may also be used to notify people maintaining the DSA 500, for example a DevOps organization, SRE, etc. For example, an incident may be automatically created for the DevOps team to check the service and bring it back to normal operation, for example in an issue tracking system (ISS), 543 such as provided by GitHub or similar. Including the determined capability AC 535 can allow the issue to be resolved more quickly and/or to be prioritized.

The determined capability may also be used to trigger an event as a follow-up event to bring back the service(s) experiencing the service degradation to normal operations. This way the distributed software application DSA may be brought into a reliable state again automatically as fast as possible. Information about the affected capability AC may here be used to determine a suitable resolution. It may also be checked automatically whether such an automatic reset to normal operation was successful, and this resolution notification may also be reported automatically, e.g., to the same users U 542 that were alerted A 541 to the affected capability.

Before raising R-Al 540 the alert A 541, it is possible to wait until the service degradation has persisted for a predefined amount of time, for example, at most or at least 10 seconds or at most or at least 15 seconds. This way, spurious reporting of service degradations is prevented. The time period may be based on a mean time to recovery (MTTR). For example, first an automatic resolution may be applied, and if the problem persists for a given amount of time, e.g., at least twice or at least ten times the MTTR, the alert A 541 to users U 542 may be raised.

The dependency map (DMAP) 555 may be obtained in various ways. In one embodiment, the dependency map is manually defined, e.g., by respective architect(s) and/or microservice owner(s). In some embodiments, at least part of the dependency map (DMAP) 555 may be extracted (Extr) 550 automatically from microservice metadata of the microservices. As an illustrative example, metadata MD1 549 of microservice MS1 501 is shown. Metadata may be derived for example from the source code from which the microservices are deployed, e.g., by accessing the source code from a source code repository such as a GitHub repository, or by accessing dependency information from an external source such as a service toolchain application. For example, a manifest file such as a Rust manifest (e.g., Cargo.toml) or Travis file (.travis.yml) can be used. In particular, dependencies of capabilities to microservices and/or reuse services, and dependencies of microservices to other microservices and/or reuse services, may be derived.

Figure 6:
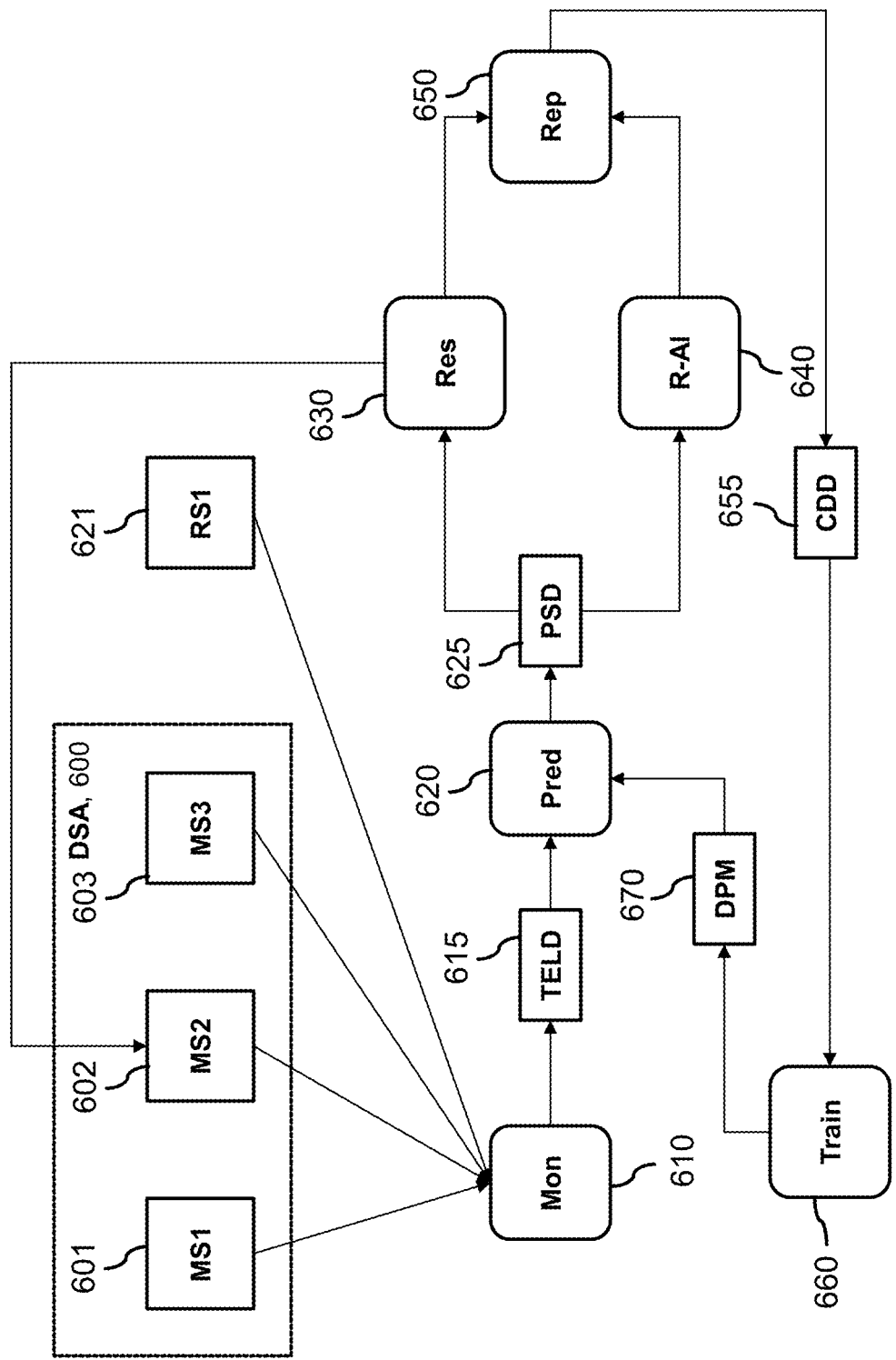
FIG. 6 shows a detailed example of how to monitor a software application.

FIG. 6 shows a detailed, yet non-limiting, example of how to monitor a software application. This example is based on the example of FIG. 5, for example, a distributed software application (DSA) 600 comprising microservices MS1 601, MS2 602, and MS3 603; a reuse service RS1 621 is shown, based on the corresponding elements of FIG. 5. The techniques of this figure are typically combined with those of FIG. 5, though it is also in principle possible to use the techniques of this figure separately. Also, as in FIG. 5, in an implementation of the provided techniques, multiple distributed software applications may be monitored at the same time.

In this example, an improvement is described with respect to FIG. 5 in that service degradations are not only detected but also predicted. Monitoring (Mon) 610 may be based on the monitoring (Mon) 510 of FIG. 5, but is in this example configured to also collect telemetry data (TELD) 615, of one, more, or all of the microservices MSi of the DSA 600. Telemetry data (TELD) 615 may be persisted in a data lake with time history.

For example, the telemetry data (TELD) 615 may comprise one or more of: CPU utilization (e.g., expressed in %); memory consumption (e.g., expressed in MB); number of application instances (e.g., expressed as an integer); number of parallel user sessions consuming the service (e.g., expressed as an integer); response time of the service (e.g., expressed in ms); data throughput (e.g., measured in MB per second). The telemetry data can also include service-specific health-check data to more accurately predict degradations. The telemetry data may be collected as a time series, e.g., at a fixed interval of at most or at least 0.1 second, at most or at least 1 second, or at most or at least 10 seconds.

Based on the telemetry data (TELD) 615, a trained degradation prediction model (DPM) 670 may be applied to predict (Pred) 620, a predicted service degradation (PSD) 625 of a microservice. The degradation prediction model may have been trained to predict service degradations of the microservice from the collected telemetry data.

As input, the DPM 670 may get a time series of the telemetry data, for example, comprising a fixed number of most recent time points, e.g., at most or at least 10 time points, at most or at least 100 time points, etc. The output of the DPM 670 can for example be binary, indicating whether or not a degradation is predicted; or categorical, indicating a type of predicted degradation, if any, or directly providing a proposed resolution for the degradation.

To obtain the DPM 670, a machine learnable model, e.g., a time series classifier, may be trained (Train) 660 on a training dataset (CDD) 655 comprising historic telemetry data of service degradations that affected at least one capability. The CDD 655 may comprise data about service degradations for which a root cause analysis (RCA) was performed. Generally, service degradations, including outages, from the past may be recorded, and it may be known for these degradations which actions were performed to bring the service back to normal operations. In particular, for historic service degradations, anomalies and/or outages, a root cause analysis may have been performed. For such a degradation for which a root cause analysis was performed, various relevant information may be collected in the training dataset (CDD) 655 including: telemetry data (TELD) 615 as discussed above; and root cause analysis information, such as symptom and context data analysis of the service before outage, status data analysis of user sessions consuming the service before the service degradation, and data analysis assessment and evaluation. The telemetry data and the RCA information may be used as training data (CDD) 655 for training the DPM 670. The DPM 670 may be trained to detect upcoming service degradations, including outages and critical situations, so that alerts may be raised before the outage occurs and/or before capabilities are affected.

Specifically, depending on the desired type of output, the service degradations may be labelled using a type, an affected capability, and/or a resolution. Depending on the type of machine learning model used and the type of training that is performed, in addition to examples representing actual service degradations, the training data (CDD) 655 may also comprise examples representing normal situations where no service degradation occurred. In any case, data may be used of historic cases where a service degradation occurred that affected a capability, and for which a root cause analysis was performed. Interestingly, the knowledge of what capability was affected and/or what resolution was used to resolve the case may allow improved resolution of the predicted case and/or better feedback on the predicted service degradation (PSD) 625.

In general, for the degradation prediction model (DPM), various known machine learnable models that operate on time series data can be used, for example a time series forest classifier or a deep neural network. The degradation prediction model (DPM) may be parameterized by a set of parameters, e.g., neural network weights and/or biases, and the like. For example, the number of trainable parameters may be at most or at least 10000, at most or at least 100000, or at most or at least 1000000. Typically, training is performed using stochastic approaches such as stochastic gradient descent, e.g., using the Adam optimizer as disclosed in Kingma and Ba, "Adam: A Method for Stochastic Optimization" (available at https://arxiv.org/abs/1412.6980 and incorporated herein by reference). As is known, such optimization methods may be heuristic and/or arrive at a local optimum. It is possible to use the same degradation prediction model (DPM) for all microservices, but in some example embodiments respective DPMs may be used for respective microservices or microservice types, at least if there is enough training data for this.

Referring to FIG. 6, several actions can be taken upon detection of a service degradation PSD 625. One action is to automatically apply Res 630, a resolution based on the predicted service degradation PSD 625. For example, the predicted service degradation PSD 625 may indicate a type of the service degradation. This type may be mapped to a resolution, for example, based on a manually defined mapping. Or, the DPM 670 may be configured to directly output a resolution. Another possibility is to, upon predicting a degradation, search for similar telemetry data (TELD) 615 in the training dataset CDD 655 and determine the resolution to be applied based on the similar cases, e.g., using a majority vote. The proposed resolution can for example be one of: increasing a database memory size; increasing a runtime memory of the instance where the microservice is running; increasing a number of service instances where the service is running; decreasing a level of logging data; cleaning up or archiving logging data; reconfiguring a service-to-service instance mapping and/or shared resources; restarting the microservice; or starting a garbage collector.

Another possible action is that, similarly to FIG. 5, an alert may be raised R-Al 640. The alert may indicate the type of predicted service degradation, and/or the capability(ies) that may be affected. The affected capability(ies) can be output by the DPM 670 and/or can be derived using the dependency map (DMAP), as also discussed with respect to FIG. 5.

When raising an alert R-Al to users is combined with applying a resolution Res, typically the resolution is applied first, and then a predefined waiting time is applied prior to raising the alert. Users may be alerted only if the degradation has actually materialized and optionally has persisted for a given amount of time, e.g., at most or at least 10 seconds or at most or at least 15 seconds. The time can for example be fixed or based on a mean time to recovery (MTTR) value, as also discussed with respect to FIG. 5.

System administrators such as DevOps may be alerted R-Al earlier, e.g., without waiting for the degradation to materialize. Instead of automatically applying Res the resolution, the resolution determined as above may also be included in the alert by assigning the resolution as a recommended action to the particular alert of the trained machine learning model DPM.

In various embodiments, the DPM may be retrained based on an updated training dataset CDD. Various methods for progressive retraining based on updates of a dataset are known, or the model could be trained again from scratch. In particular, the model may be updated based on a degradation that occurred.

For example, a root cause analysis was performed of a degradation, and information is added to the dataset CDD. In this case, it could be that the degradation was predicted by the model DPM when it occurred, or that it was not. In case it was predicted, an automatic resolution may have been applied, and this resolution may be validated by it being confirmed by a system administrator as part of the root cause analysis; it is also possible that a resolution was automatically determined and then proposed to a system administrator who validated it by confirming it. It is also possible that no resolution was automatically determined, for example because the model only raises alerts or because the model did not predict the degradation. In such cases, a resolution may have been manually chosen by a system administrator and validated in this way. In any case, the validated resolution may be included in the training data CDD and thereby used to retrain the DPM, allowing future predictions to be improved.

The DPM may also be retrained based on instances where the DPM has predicted a degradation but it did not materialize, e.g., by using the instance as a negative example for the training, reducing false positives of the model.

Figure 7:
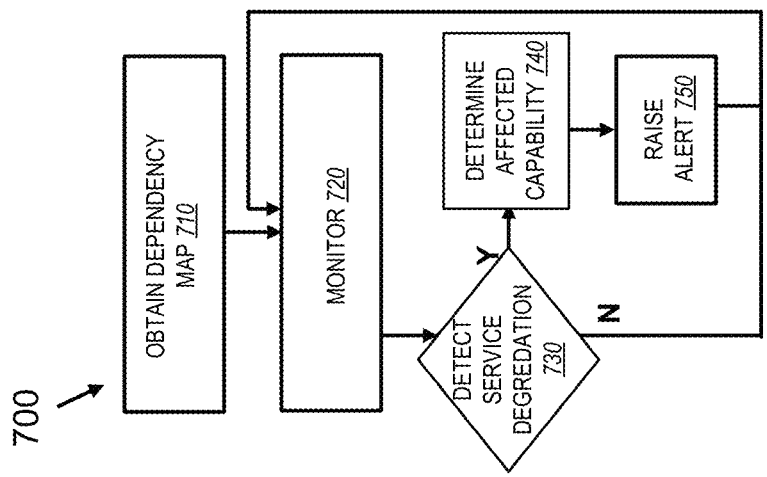
FIG. 7 shows a computer-implemented method of monitoring.

FIG. 7 shows a block-diagram of computer-implemented method 700 of monitoring a distributed software application. The distributed software application may provide multiple capabilities and may be distributed into multiple microservices. The method 700 may correspond to an operation of the system 100 of FIG. 1. However, this is not a limitation, in that the method 700 may also be performed using another system, apparatus or device.

The method 700 may comprise, in an operation 710 titled "OBTAIN DEPENDENCY MAP", obtaining a dependency map representing dependencies of the distributed software application. A depending capability or microservice of the software application may depend on one or more depended-on microservices of the software application and/or reuse services external to the software application.

The method 700 may comprise, in an operation 720 titled "MONITOR", periodically monitoring availability of the multiple microservices.

The method 700 may comprise, in an operation 730 titled "DETECT SERVICE DEGRADATION", detecting a service degradation of a microservice.

The method 700 may comprise, if the periodic monitoring detects the service degradation, in an operation 740 titled "DETERMINE AFFECTED CAPABILITY", determining at least one capability of the multiple capabilities affected by the service degradation according to the dependency map.

The method 700 may comprise, if the periodic monitoring detects the service degradation, in an operation 750 titled "RAISE ALERT", raising an alert that the capability is affected.

It will be appreciated that, in general, the operations of method 700 of FIG. 7 may be performed in any suitable order, e.g., consecutively, simultaneously, or a combination thereof, subject to, where applicable, a particular order being necessitated, e.g., by input/output relations.

Figure 8:
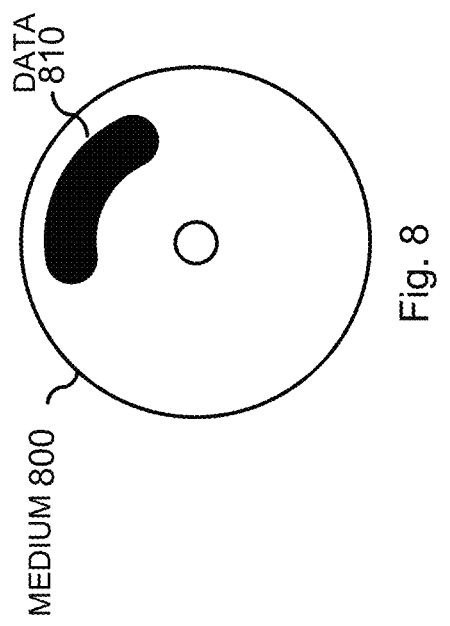
FIG. 8 shows a computer-readable medium comprising data.

The method(s) may be implemented on a computer as a computer implemented method, as dedicated hardware, or as a combination of both. As also illustrated in FIG. 8, instructions for the computer, e.g., executable code, may be stored on a computer-readable medium 800, e.g., in the form of a series of machine-readable physical marks and/or as a series of elements having different electrical, e.g., magnetic, or optical properties or values. The medium 800 may be transitory or non-transitory. Examples of computer-readable mediums include memory devices, optical storage devices, integrated circuits, servers, online software, etc. FIG. 8 shows an optical disc. Alternatively, the computer-readable medium 800 may comprise data 810 representing a degradation prediction model trained to predict service degradations of a microservice from collected telemetry data, wherein the degradation prediction model has been trained on a training dataset comprising historic telemetry data of service degradations of the microservice that affected at least one capability, as described herein.

Examples, embodiments or optional features, whether indicated as non-limiting or not, are not to be understood as limiting the inventive subject matter as claimed.

It should be noted that the above-mentioned embodiments illustrate rather than limit the inventive subject matter, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The inventive subject matter may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Figure 9:
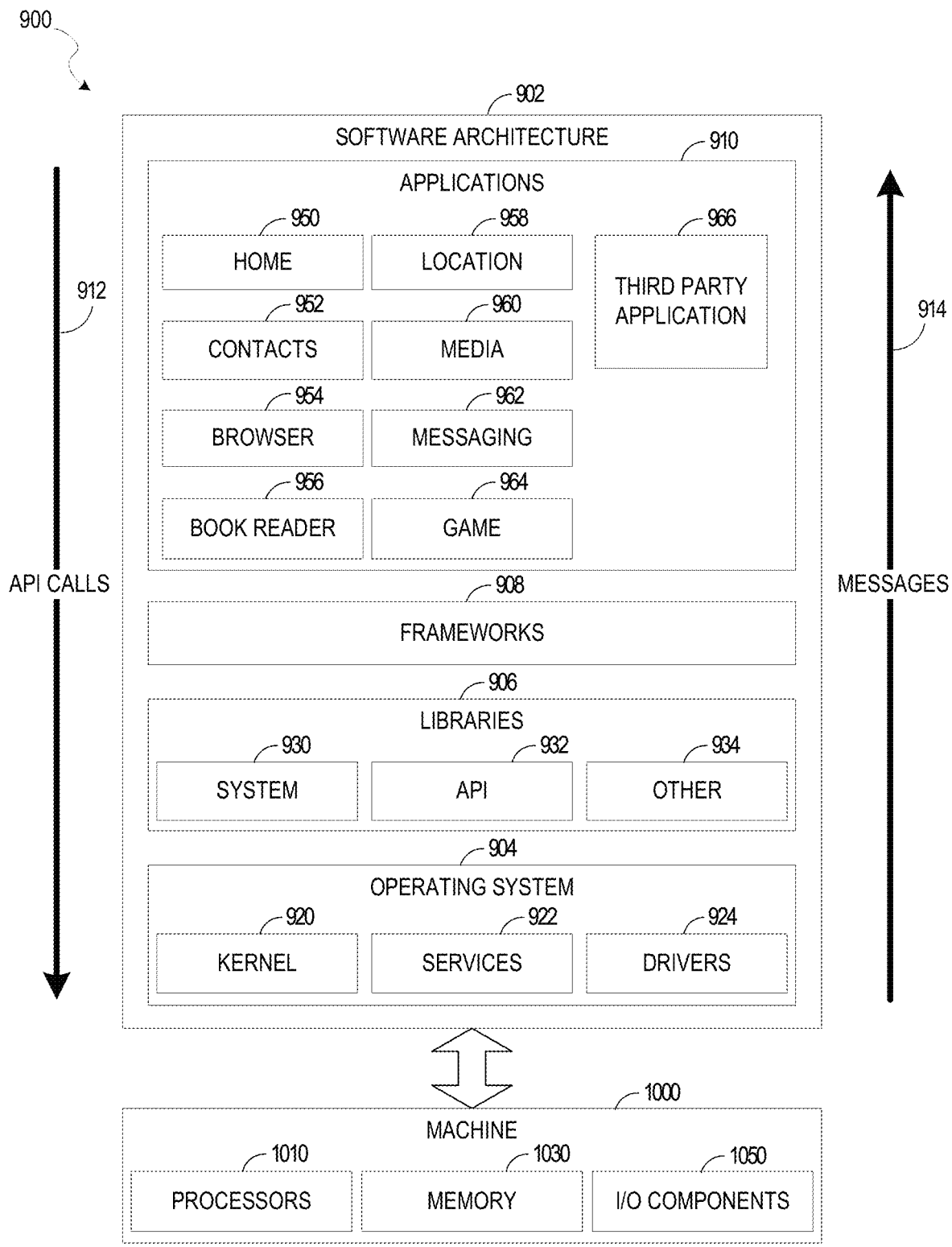
FIG. 9 is a block diagram illustrating a software architecture, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke Application Program Interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. The applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 966 can invoke the API calls 912 provided by the operating system 904 to facilitate functionality described herein.

Figure 10:
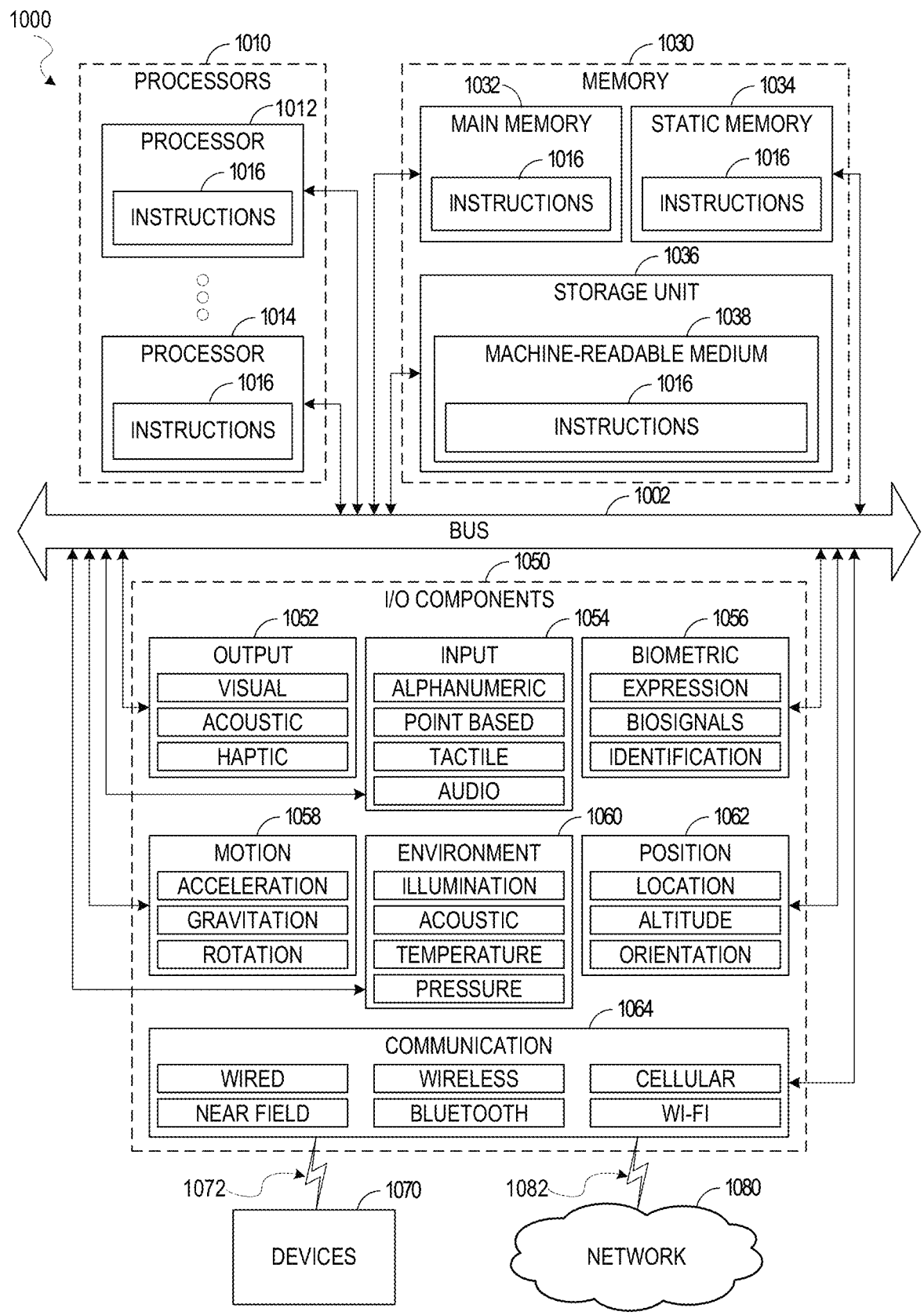
FIG. 10 illustrates a diagrammatic representation of a machine in the form of a computer system within which a set of instructions may be executed for causing the machine to perform any one or more of the methodologies discussed herein.

FIG. 10 illustrates a diagrammatic representation of a machine 1000 in the form of a computer system within which a set of instructions may be executed for causing the machine 1000 to perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) cause the machine 1000 to perform any one or more of the methodologies discussed herein to be executed. The instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 8G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method for monitoring a distributed software application, wherein the distributed software application provides multiple capabilities and is distributed into multiple microservices, the method comprising:

obtaining a dependency map representing dependencies of the distributed software application, wherein a depending capability or microservice of the software application depends on one or more depended-on microservices of the software application and/or reuse services external to the software application, wherein the dependencies include multiple microservices that communicate with each other via a communication mechanism that does not use an application program interface (API), the dependency map indicating that a first microservice has a first capability dependent on a second microservice and that the first microservice has a second capability dependent on a third microservice, the first and second capabilities each being a different user-facing functionality of the first microservice;
periodically monitoring availability of the multiple microservices; and
in response to the periodic monitoring detecting a service degradation of the second microservice:
determining that the first capability is affected by the service degradation but that the second capability is not affected by the service degradation, according to the dependency map; and
raising an alert that the first capability is affected.

2. The method of claim 1, further comprising:
obtaining historic usage data representing usages of the multiple capabilities by a set of multiple users of the distributed software application;
determining a subset of the multiple users affected by the service degradation according to their usages of the affected capabilities according to the usage data; and
raising the alert to the affected users.

3. The method of claim 2, further comprising obtaining a resolution notification of the service degradation of the microservice and reporting the resolution notification to the affected users.

4. The method of claim 1, wherein the distributed software application is a cloud-based application using a service mesh.

5. The method of claim 1, wherein the dependency map indicates a dependency type between a depending capability or microservice and a depended-on microservice or reuse service, wherein the dependency type is selected from a set of dependency types including a soft dependency and a hard dependency, and wherein a capability outage is reported according to dependency types linking the affected capability and the degraded microservice.

6. The method of claim 1, further comprising obtaining microservice metadata of the multiple microservices, and automatically deriving the dependency map from the microservice metadata, wherein the automatically deriving comprises automatically deriving a dependency of a capability on a microservice and/or automatically deriving a dependency of a first microservice on a second microservice and/or automatically deriving a dependency of a microservice on a reuse service.

7. The method of claim 1, further comprising automatically reporting the service degradation of the microservice via an issue tracking system.

8. The method of claim 1, further comprising, before the alert is raised, waiting until the service degradation has persisted for a predefined amount of time.

9. The method of claim 1, further comprising periodically applying a trained degradation prediction model to telemetry data collected of a microservice of the multiple microservices, wherein the trained degradation prediction model has been trained to predict service degradations of the microservice from the collected telemetry data, wherein the degradation prediction model has been trained on a training dataset comprising historic telemetry data of service degradations of the microservice that affected at least one capability.

10. The method of claim 9, wherein the degradation prediction model is configured to output a type of the predicted service degradation, and wherein the model further comprises determining a resolution for the predicted service degradation based on the type.

11. The method of claim 10, further comprising monitoring the distributed software application in a fully autonomous way by automatically applying the resolution.

12. The method of claim 9, further comprising obtaining a validated resolution for the predicted service degradation, and retraining the degradation prediction model based on the validated resolution.

13. A system for monitoring a distributed software application, wherein the distributed software application provides multiple capabilities and is distributed into multiple microservices, the system comprising:
a data interface for accessing a dependency map representing dependencies of the distributed software application, wherein a depending capability or microservice of the software application depends on one or more depended-on microservices of the software application and/or reuse services external to the software application, wherein the dependencies include multiple microservices that communicate with each other via a communication mechanism that does not use an application program interface (API), the dependency map indicating that a first microservice has a first capability dependent on a second microservice and that the first microservice has a second capability dependent on a third microservice, the first and second capabilities each being a different user-facing functionality of the first microservice;
a computer-readable medium storing instructions that, when executed by at least one hardware processor, cause the at least one hardware processor to perform operations comprising:
periodically monitor availability of the multiple microservices; and
in response to the periodic monitoring detecting a service degradation of the second microservice:
determining that the first capability is affected by the service degradation but that the second capability is not affected by the service degradation, according to the dependency map; and
raising an alert that the first capability is affected.

14. The system of claim 13, wherein the operations further comprise:
obtaining historic usage data representing usages of the multiple capabilities by a set of multiple users of the distributed software application;
determining a subset of the multiple users affected by the service degradation according to their usages of the affected capabilities according to the usage data; and
raising the alert to the affected users.

15. The system of claim 14, wherein the operations further comprise obtaining a resolution notification of the service degradation of the microservice and reporting the resolution notification to the affected users.

16. The system of claim 13, wherein the distributed software application is a cloud-based application using a service mesh.

17. The system of claim 13, wherein the dependency map indicates a dependency type between a depending capability or microservice and a depended-on microservice or reuse service, wherein the dependency type is selected from a set of dependency types including a soft dependency and a hard dependency, and wherein a capability outage is reported according to dependency types linking the affected capability and the degraded microservice.

18. The system of claim 13, wherein the operations further comprise obtaining microservice metadata of the multiple microservices, and automatically deriving the dependency map from the microservice metadata, wherein the automatically deriving comprises automatically deriving a dependency of a capability on a microservice and/or automatically deriving a dependency of a first microservice on a second microservice and/or automatically deriving a dependency of a microservice on a reuse service.

19. The system of claim 13, wherein the operations further comprise automatically reporting the service degradation of the microservice via an issue tracking system.

20. A non-transitory machine-readable medium storing instructions which, when executed by one or more processors, cause the one or more processors to perform operations for monitoring a distributed software application, wherein the distributed software application provides multiple capabilities and is distributed into multiple microservices, the operations comprising:

obtaining a dependency map representing dependencies of the distributed software application, wherein a depending capability or microservice of the software application depends on one or more depended-on microservices of the software application and/or reuse services external to the software application, wherein the dependencies include multiple microservices that communicate with each other via a communication mechanism that does not use an application program interface (API), the dependency map indicating that a first microservice has a first capability dependent on a second microservice and that the first microservice has a second capability dependent on a third microservice, the first and second capabilities each being a different user-facing functionality of the first microservice;

periodically monitoring availability of the multiple microservices; and in response to the periodic monitoring detecting a service degradation of the second microservice:

determining that the first capability is affected by the service degradation but that the second capability is not affected by the service degradation, according to the dependency map; and raising an alert that the first capability is affected.

\* \* \* \* \*